(12) United States Patent
Walters et al.

(10) Patent No.: US 10,628,434 B1
(45) Date of Patent: Apr. 21, 2020

(54) SYSTEMS AND METHODS FOR INDEXING AND SEARCHING RULE-BASED MODELS

(71) Applicant: Capital One Services, LLC, McLean, VA (US)

(72) Inventors: Austin Walters, Savoy, IL (US); Jeremy Goodsitt, Champaign, IL (US); Vincent Pham, Champaign, IL (US); Fardin Abdi Taghi Abad, Champaign, IL (US); Anh Truong, Champaign, IL (US); Kenneth Taylor, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/207,060

(22) Filed: Nov. 30, 2018

(51) Int. Cl.
| | |
|---|---|
| *G06F 16/2458* | (2019.01) |
| *G06F 16/28* | (2019.01) |
| *G06F 16/22* | (2019.01) |
| *G06F 16/248* | (2019.01) |
| *G06N 3/08* | (2006.01) |
| *G06F 16/242* | (2019.01) |
| *G06N 3/04* | (2006.01) |

(52) U.S. Cl.
CPC ...... *G06F 16/2468* (2019.01); *G06F 16/2228* (2019.01); *G06F 16/243* (2019.01); *G06F 16/248* (2019.01); *G06F 16/2438* (2019.01); *G06F 16/285* (2019.01); *G06N 3/04* (2013.01); *G06N 3/08* (2013.01)

(58) Field of Classification Search
CPC ............... G06F 16/285; G06F 16/2228; G06F 16/2468; G06F 16/248; G06F 16/2438
USPC ......................................................... 707/737
See application file for complete search history.

(56) References Cited

U.S. PATENT DOCUMENTS

| | | | | |
|---|---|---|---|---|
| 10,127,224 | B2* | 11/2018 | Deleeuw | G06F 17/2785 |
| 2011/0072411 | A1* | 3/2011 | Cornell | G06F 8/10 |
| | | | | 717/105 |
| 2012/0278353 | A1* | 11/2012 | Carrato | G06F 16/90 |
| | | | | 707/769 |
| 2012/0283885 | A1* | 11/2012 | Mannar | G05B 23/024 |
| | | | | 700/286 |
| 2016/0179787 | A1* | 6/2016 | Deleeuw | G06F 17/2785 |
| | | | | 704/9 |
| 2017/0109676 | A1* | 4/2017 | Marcu | G06F 11/3672 |
| 2017/0235788 | A1* | 8/2017 | Borisyuk | G06F 16/2272 |
| | | | | 707/723 |
| 2017/0236073 | A1* | 8/2017 | Borisyuk | G06Q 50/01 |
| | | | | 706/12 |
| 2018/0192046 | A1* | 7/2018 | Teo | H04N 19/176 |
| 2018/0255082 | A1* | 9/2018 | Ostergaard | B60R 16/0231 |
| 2018/0357543 | A1* | 12/2018 | Brown | G06N 3/08 |

\* cited by examiner

*Primary Examiner* — Phong H Nguyen
(74) *Attorney, Agent, or Firm* — Finnegan, Henderson, Farabow, Garrett & Dunner, LLP (57) ABSTRACT

The present disclosure relates to systems and methods for indexing and clustering machine learned models. Moreover, the present disclosure relates to systems and methods for searching indexed machine learned models and receiving suggested models based on the clustering of the same.

18 Claims, 8 Drawing Sheets

SYSTEMS AND METHODS FOR INDEXING AND SEARCHING RULE-BASED MODELS

TECHNICAL FIELD

The disclosed embodiments relate to a platform for indexing and searching machine learned models. In particular, the disclosed embodiments relate to techniques for generalizing machine learned models in order to index and cluster a plurality of different models. By generalizing, the disclosed platform allows for more accurate indexing and clustering of the models.

BACKGROUND

Modern computing often uses a large number of machine learned models, such as random forest models, regression models, neural networks, k-means clustering models, and the like. However, when a company or other group builds a large number of such machine learned models, it becomes difficult and costly to maintain the models and store the models in a meaningful fashion. Indeed, conventionally, many machine learned models are lost on company-wide systems due to inability to effectively find and use models whose creators have left the company or moved to other projects.

Moreover, machine learned models comprise different types of models. Accordingly, it is not possible to index these different models in comparable ways. One technique is to index hyperparameters of the models, but different types of models have different types of hyperparameters, which are not always comparable. For example, neural networks have a number of layers and a number of nodes while decision trees have a number of leaves. Embodiments of the present disclosure may solve these technical problems.

SUMMARY

Consistent with disclosed embodiments, systems, methods, and computer readable media are provided for indexing and mapping models by hyperparameters as well as searching indexed models.

The disclosed embodiments may include a system for indexing and mapping models by hyperparameters and cluster characteristics. The system may comprise at least one processor and at least one non-transitory memory storing instructions that, when executed by the at least one processor cause the at least one processor to perform operations. The operations may comprise receiving a plurality of models. The models may be configured to transform a base representation of data into a structured representation of the data. The operations may further comprise, using one or more templates, generalizing one of more of the models into one or more corresponding neural network architectures; mapping hyperparameters of the one or more generalized models; indexing the one or more generalized models by the hyperparameters; clustering the one or more indexed models using the hyperparameters; and enabling searching for models using the clustered index.

The disclosed embodiments may further include a system for searching indexed models by hyperparameters and cluster characteristics. The system may comprise at least one processor and at least one non-transitory memory storing instructions that, when executed by the at least one processor cause the at least one processor to perform operations. The operations may comprise receiving a query requesting at least one model and executing the query against an index of generalized machine learning models. The index may include hyperparameters of the models. The operations may further comprise retrieving, in response to the executed query, results including at least one model, and retrieving at least one additional model in a same cluster as the at least one model. The cluster may be based on at least one of structural similarities or hyperparameter similarities. The operations may further comprise returning the at least one model and the at least one additional model as a response to the query.

The disclosed embodiments may further include a system for suggesting similar models in response to model selection. The system may comprise at least one processor and at least one non-transitory memory storing instructions that, when executed by the at least one processor cause the at least one processor to perform operations. The operations may comprise receiving, from a user, an identifier associated with at least one model; retrieving, from a database of models clustered by at least one of structural similarities or hyperparameter similarities, the at least one model; using the clusters in the database, identifying one or more additional models within a same cluster as the at least one model or within a neighboring cluster; and returning the at least one model and the one or more additional models to the user.

The disclosed embodiments may further include a system for indexing and mapping models by hyperparameters and cluster characteristics. The system may comprise at least one processor and at least one non-transitory memory storing instructions that, when executed by the at least one processor cause the at least one processor to perform operations. The operations may comprise receiving a plurality of models. One or more of the plurality of models may be configured to transform a base representation of data into a structured representation of the data. The operations may further comprise, using one or more templates, generalizing one or more of the plurality of models into a corresponding neural network architecture; indexing one or more generalized models by hyperparameters of the generalized model; clustering the indexed models using the one or more templates; and storing the generalized models with the received models, the index, and the clusters such that the index and the clusters are searchable.

The disclosed embodiments may further include a system for searching indexed models by hyperparameters and cluster characteristics. The system may comprise at least one processor and at least one non-transitory memory storing instructions that, when executed by the at least one processor cause the at least one processor to perform operations. The operations may comprise receiving a query requesting models with at least one hyperparameter within at least one range and executing the query against and indexed and clustered database of models. The index may include hyperparameters of the models in the database, and the clusters may be based on the hyperparameters. The operations may further comprise retrieving, in response to the executed query, results including the requested models and one or more additional models in the same cluster as the requested models or neighboring clusters, and displaying the results by displaying the requested models on one region of a graphical user interface and the one or more additional model on another region of the graphical user interface.

The disclosed embodiments may further include a system for suggesting similar models in response to model selection. The system may comprise at least one processor and at least one non-transitory memory storing instructions that, when executed by the at least one processor cause the at least one processor to perform operations. The operations may comprise receiving a query requesting at least one model and executing the query against an index of clustered machine learning models. The index may include hyperparameters of the models, and the clusters may be based on the hyperparameters. The operations may further comprise retrieving, in response to executing the query, results including the at least one model, as well as one or more additional models having one or more associated degrees of belonging to the same cluster as the at least one model within a threshold; and displaying the results by displaying the at least one model and the one or more additional models together with the one or more associated degrees of belonging on a graphical user interface.

Consistent with other disclosed embodiments, non-transitory computer readable storage media may store program instructions, which are executed by at least one processor device and perform any of the methods described herein.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments consistent with the disclosure and, together with the description, serve to explain the principles of the disclosure. The drawings are not necessarily to scale or exhaustive. Instead, emphasis is generally placed upon illustrating the principles of the embodiments described herein. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

The disclosed embodiments can be used to automatically index and cluster machine learned data models, even if those models are of different types. Using generalized representations of the models, which may comprise neural networks, the disclosed embodiments can produce indices using comparable hyperparameters and cluster the models using those hyperparameters. In some aspects, the models may process unstructured data, such as one or more JSON (JavaScript Object Notation), one or more delimited files (e.g., comma-separated value (CSV) files or the like), or the like into structured data, such as one or more relational data structures (e.g., tabular data or the like), one or more graphical data structures, or the like. In various embodiments, the disclosed systems may use the clusters to suggest models to users that are related to queries from the users.

Figure 1:
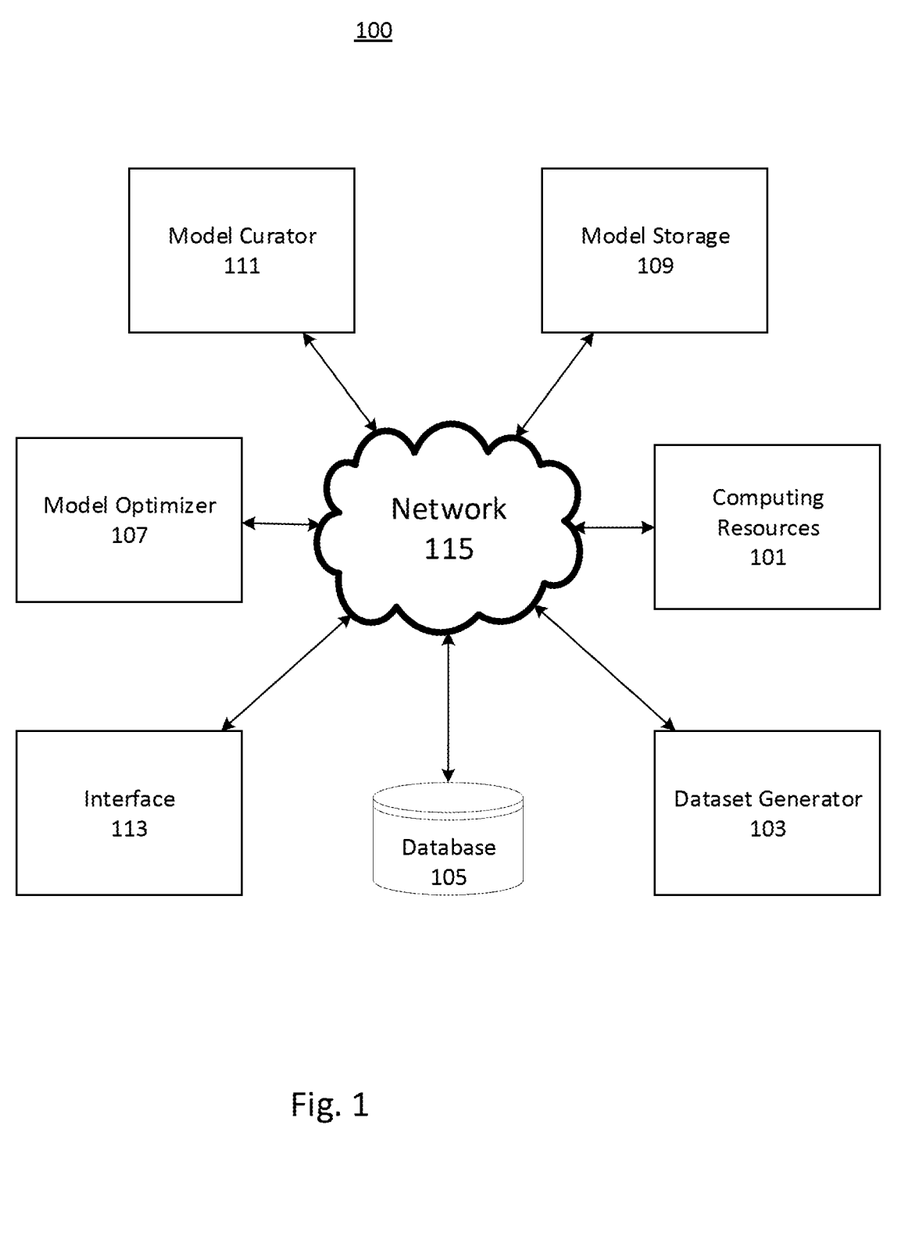
FIG. 1 depicts an exemplary cloud-computing environment for indexing and clustering data models, consistent with disclosed embodiments.

FIG. 1 depicts a cloud-computing environment 100 for indexing and clustering machine learned data models. Environment 100 can be configured to support indexing and clustering of data models, searching and retrieval of data models, optimized choice of parameters for machine learning, and imposition of rules on indexed and clustered data models. Environment 100 can be configured to expose an interface for communication with other systems. Environment 100 can include computing resources 101, dataset generator 103, database 105, model optimizer 107, model storage 109, model curator 111, and interface 113. These components of environment 100 can be configured to communicate with each other, or with external components of environment 100, using network 115. The particular arrangement of components depicted in FIG. 1 is not intended to be limiting. System 100 can include additional components, or fewer components. Multiple components of system 100 can be implemented using the same physical computing device or different physical computing devices.

Computing resources 101 can include one or more computing devices configurable to index and cluster data models. The computing devices can be special-purpose computing devices, such as graphical processing units (GPUs) or application-specific integrated circuits. The cloud computing resources can be general-purpose computing devices. The computing devices can be configured to host an environment for indexing and clustering data models. For example, the computing devices can host virtual machines, pods, or containers. The computing devices can be configured to run applications for generating data models. For example, the computing devices can be configured to run SAGEMAKER, GENESYS, Tensorflow, or similar machine learning training applications. Computing resources 101 can be configured to receive models for training from model optimizer 107, model storage 109, or another component of system 100. Computing resources 101 can be configured to index and cluster received models, e.g., using hyperparameters.

Dataset generator 103 can include one or more computing devices configured to generate data. Dataset generator 103 can be configured to provide data to computing resources 101, database 105, to another component of system 100 (e.g., interface 113), or another system (e.g., an APACHE KAFKA cluster or other publication service). Dataset generator 103 can be configured to receive data from database 105 or another component of system 100. Dataset generator 103 can be configured to receive data models from model storage 109 or another component of system 100. In some embodiments, dataset generator 103 can be configured to generate synthetic data. For example, dataset generator 103 can be configured to generate synthetic data by identifying and replacing sensitive information in data received from database 103 or interface 113. As an additional example, dataset generator 103 can be configured to generate synthetic data using a data model without reliance on input data. For example, the data model can be configured to generate data matching statistical and content characteristics of a training dataset. In some aspects, the data model can be configured to map from a random or pseudorandom vector to elements in the training data space.

Database 105 can include one or more databases configured to store indexed and clustered models for use by system 100. For example, database 105 may store models associated with generalized representations of those models (e.g., neural network architectures stored in TensorFlow or other standardized formats). The databases can include cloud-based databases (e.g., AMAZON WEB SERVICES S3 buckets) or on-premises databases.

Model optimizer 107 can include one or more computing systems configured to optimize hyperparameters of indexed and clustered data models for system 100. For example, model optimizer 107 can be configured to adjust one or more hyperparameters of received models and/or corresponding generalized representations of those models before or during indexing and clustering by computing resources 101. Model optimizer 107 can be configured to optimize models based on instructions received from a user or another system. These instructions can be received through interface 113. For example, model optimizer 107 can be configured to receive input of one or more thresholds, one or more loss functions, and/or one or more limits on a number of interactions and apply the input for optimizing a received model (or corresponding generalized representation such as a neural network) on computing resources 101.

Additionally or alternatively, model optimizer 107 can be configured to apply one or more templates to a data model retrieved from model storage 109 and applying the templates to generate a generalized representation of the retrieved model (e.g., a neural network). In some embodiments, model optimizer 107 can be configured to further select model training parameters for the generalized representation. This selection can be based on model performance feedback received from computing resources 101. Model optimizer 107 can be configured to provide trained generalized representations to model storage 109 for storing in association with corresponding models.

Model storage 109 can include one or more databases configured to store data models and indexing and cluster information associated therewith. Model storage 109 can be configured to provide information regarding available data models to a user or another system. This information can be provided using interface 113. The databases can include cloud-based databases (e.g., AMAZON WEB SERVICES S3 buckets) or on-premises databases. The information can include model information, such as the type and/or purpose of the model and any measures of classification error.

Model curator 111 can be configured to cluster models and/or generalized representations of the models. For example, model curator 111 can be configured to cluster models based on comparisons of hyperparameters of the models themselves and/or of their generalized representations. Additionally or alternatively, model curator 111 can be configured to cluster models based on similarities (in hyperparameters or other structural variables, such as activation functions, number of weights, or the like) in structure of the models themselves and/or of their generalized representations.

Interface 113 can be configured to manage interactions between system 100 and other systems using network 115. In some aspects, interface 113 can be configured to publish data received from other components of system 100 (e.g., dataset generator 103, computing resources 101, database 105, or the like). This data can be published in a publication and subscription framework (e.g., using APACHE KAFKA), through a network socket, in response to queries from other systems, or using other known methods. The data can be synthetic data, as described herein. As an additional example, interface 113 can be configured to provide results from indexed and clustered models in model storage 109 in response to a query received via interface 113. In various aspects, interface 113 can be configured to provide data or instructions received from other systems to components of system 100. For example, interface 113 can be configured to receive instructions for retrieving data models (e.g., according to a query of indexed hyperparameters, clustered structural similarities, or the like) from another system and provide this information to model optimizer 107. As an additional example, interface 113 can be configured to receive data including sensitive portions from another system (e.g. in a file, a message in a publication and subscription framework, a network socket, or the like) and provide that data to dataset generator 103 or database 105.

Network 115 can include any combination of electronics communications networks enabling communication between components of system 100. For example, network 115 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

Disclosed herein are improved systems and methods for efficiently searching and indexing (as well as clustering) data models. In some embodiments, these data models may parse unstructured data to generate structured data.

As used herein, "unstructured" does not necessarily refer to data that is haphazard or lacking in discernible patterns. Rather, "unstructured" data may refer to data stored without logical connection among portions even if the data is stored, for example, as a text file with a pattern and delimiter that impart meaning to the data even though no logical connection is stored. Accordingly, the "structure" of any unstructured data may comprise patterns, delimiters, and other components of the data that impart meaning.

Figure 2:
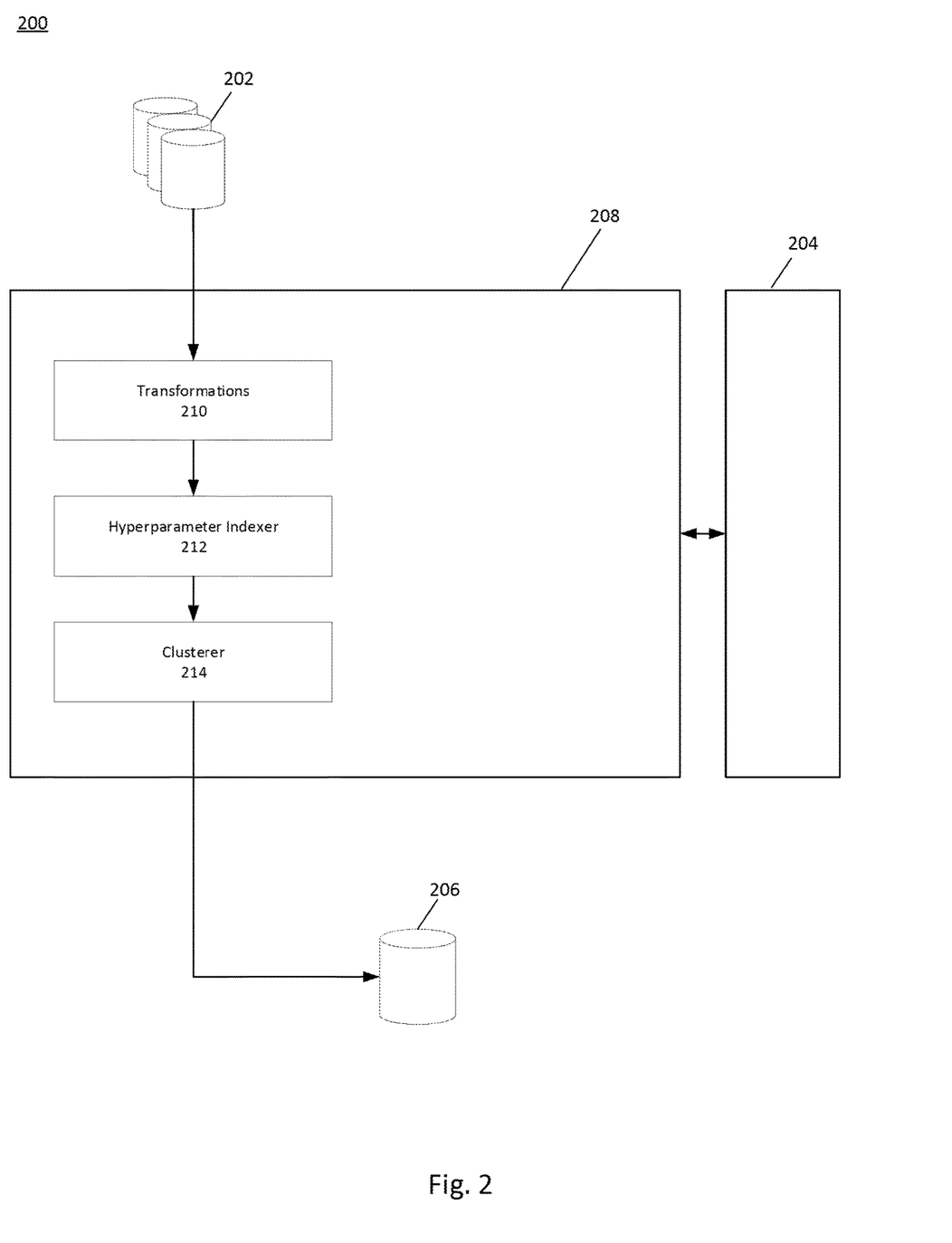
FIG. 2 depicts an exemplary system for indexing and clustering machine learned models, consistent with disclosed embodiments.

FIG. 2 depicts an exemplary system 200 for indexing and clustering machine learned models, consistent with disclosed embodiments. System 200 may include one or more databases 202, one or more processors 204, and one or more databases 206. The one or more processors may execute one or more programs (e.g., transformations 210, hyperparameter indexer 212, and clusterer 214) for indexing and clustering data models. The one or more programs may be stored in a memory 208, as depicted in FIG. 2. System 200 may be implemented as a component of system 100 or may be a system separate from system 100.

Databases 202 may include one or more databases configured to store data models for use by system 200. In some embodiments, databases 202 may be included in database 115 of system 100. Databases 202 can include cloud-based databases (e.g., AMAZON WEB SERVICES S3 buckets)

and/or on-premises databases. In some embodiments, databases 202 may store data models for parsing unstructured data, such as log files, into structured data.

Databases 206 may also include one or more databases configured to store data for use by system 200. Databases 206 can include cloud-based databases (e.g., AMAZON WEB SERVICES S3 buckets) and/or on-premises databases. In some embodiments, databases 206 may store training data for and/or structured data output by said data models. Database 206 may be included as a part of previously described database 115.

Transformations 210 may receive one or more data models from databases 202. The one or more models may include one or more linear regressions, neural networks, or the like that parse unstructured data into structured data. In other aspects, the model(s) may include one or more linear regressions, neural networks, or the like that predict an outcome based on input or predict a full input based on partial inputs (e.g., recommending "Capital One" in response to "Cap").

In any of the embodiments described above, the model(s) may include statistical algorithms. For example, the model(s) may include regression models that estimate the relationships among input and output variables. In some aspects, the model(s) may additionally or alternatively sort elements of a dataset using one or more classifiers to determine the probability of a specific outcome. The model(s) may be parametric, non-parametric, and/or semi-parametric.

In some embodiments, the model(s) may include a convolutional neural network model. The convolutional neural network may comprise an input layer, one or more middle layers, and one or more output layers. In some embodiments, the input layer may comprise multiple matrices (e.g., a matrix for pixel values in an image, a matrix for characters in an input string, or the like). Alternatively, the input layer may comprise a single matrix (e.g., a single matrix of pixel brightness values, a single matrix of character distributions, or the like). In some aspects, one or more middle layers and/or the output layer may be a deterministic function of the values of the preceding layer.

The convolutional neural network may include one or more convolutional layers. A convolutional layer may be configured to convolve one or more spatial filters with the convolutional layer input to generate a convolutional layer output tensor. One or more spatial filter functions may be defined by a matrix of weights to be applied to the elements of the preceding layer during a convolution operation, an offset, and/or an activation function. Training the convolutional neural network may comprise modifying the weights and offsets using a backpropagation algorithm. In some embodiments, the convolutional neural network may also include pooling layers and/or fully connected layers.

Additionally or alternatively, the model(s) may include a deep fully connected neural network. The deep fully connected neural network may comprise an input layer, one or more middle layers, and one or more output layers. The middle layer(s) may be fully connected. Accordingly, one or more middle layers may have a plurality of neurons (or nodes), the neurons being connected to one or more (or all) neurons of the previously layer.

Additionally or alternatively, the model(s) may include a recurrent neural network. The recurrent neural network may comprise an input layer, one or more middle layers, and one or more output layers. The middle layer(s) may include a plurality of neurons (or nodes) that use input from one or more neurons of a previous layer in combination with previous (in time) states and/or outputs of the neuron itself.

Although the above examples include neural networks, other embodiments may include additional or alternative models. For example, additionally or alternatively, the model(s) may include Random Forests, composed of a combination of decision tree predictors. Such decision trees may comprise a data structure mapping observations about an input, in the "branch" of the tree, to conclusions about a target value, in the "leaves" of the tree. An individual tree may depend on the values of a random vector sampled independently and with the same distribution for a plurality of (or all) trees in the forest. Any other machine learned models may be applied in addition to or in lieu of a Random Forest model.

Transformations 210 may transform each received model into a generalized representation. In an embodiment, transformations 210 may include one or more blueprints for converting a decision tree to an equivalent neural network structure, a blueprint for converting a Bayesian classifier to an equivalent neural network structure, or the like. Additionally or alternatively, a grid search may map hyperparameters of each received model (e.g., a decision tree, a Bayesian classifier, or the like) to an equivalent neural network structure. In some embodiments, one or more hyperparameters may be added. For example, the LASSO algorithm may add a regularization hyperparameter to a model comprising an ordinary least squares regression such that the model is suitable for a grid search.

Although not depicted in FIG. 2, processor 204 may further re-train the generalized representation before application of hyperparameter indexer 212 and/or before application of clusterer 214. For example, processor 204 may use training data initially used to train each received model to then train the generated representation output by transformations 210. In some embodiments, processor 204 may generate synthetic data for further training and/or testing of the generalized representation.

Hyperparameter indexer 212 may index parameters of the generalized representations from transformations 210 (e.g., a regularization hyperparameter, a number of coefficients associated with nodes of a neural network, a number of layers of a neural network, a number of leaves in a decision tree, or a learning rate, or the like). In some embodiments, hyperparameter indexer 212 may store the hyperparameters as an index in database(s) 206 with the generalized representations. Hyperparameter indexer 212 may further store the received models in association with the generalized representations.

Clusterer 214 may cluster the generalized representations. Accordingly, clusterer 214 may apply one or more thresholds to one or more hyperparameters in order to classify the generalized representations into one or more clusters. Additionally or alternatively, clusterer 214 may apply hierarchical clustering, centroid-based clustering, distribution-based clustering, density-based clustering, or the like to the one or more hyperparameters. In any of the embodiments described above, clusterer 214 may perform fuzzy clustering such that each generalized representation has an associated score (such as 3 out of 5, 22.5 out of 100, a letter grade such as 'A' or 'C,' or the like) indicating a degree of belongingness in each cluster. In such embodiments, clusterer 214 may store the degrees of belongingness in database(s) 206 associated with the generalized representations.

In addition to or in lieu of the hyperparameters, clusterer 214, may compare structural similarities of the generalized representations to perform the clustering. For example, clusterer 214 may cluster the generalized representations based on a type of activation function used in one or more nodes of a neural network such that one cluster is for polynomials (with possible sub-clusters based on order), another cluster is for logistic functions, or the like. In another example, cluster 214 may cluster the generalized representations based on ranges of one or more weights associated with one or more nodes of the neural network.

As explained above, the generalized representations may comprise neural networks or any other uniform type of model stored as TensorFlow or in any other standardized format. Moreover, as depicted in FIG. 2, the indexed and clustered representations may be output for storage, e.g., in databases 206. Additionally or alternatively, the indexed and clustered representations may be output to an external device, e.g., another server, a third party data repository (e.g., AMAZON WEB SERVICES S3 buckets), a user such an administrator diagnosing a problem, or the like.

Figure 3:
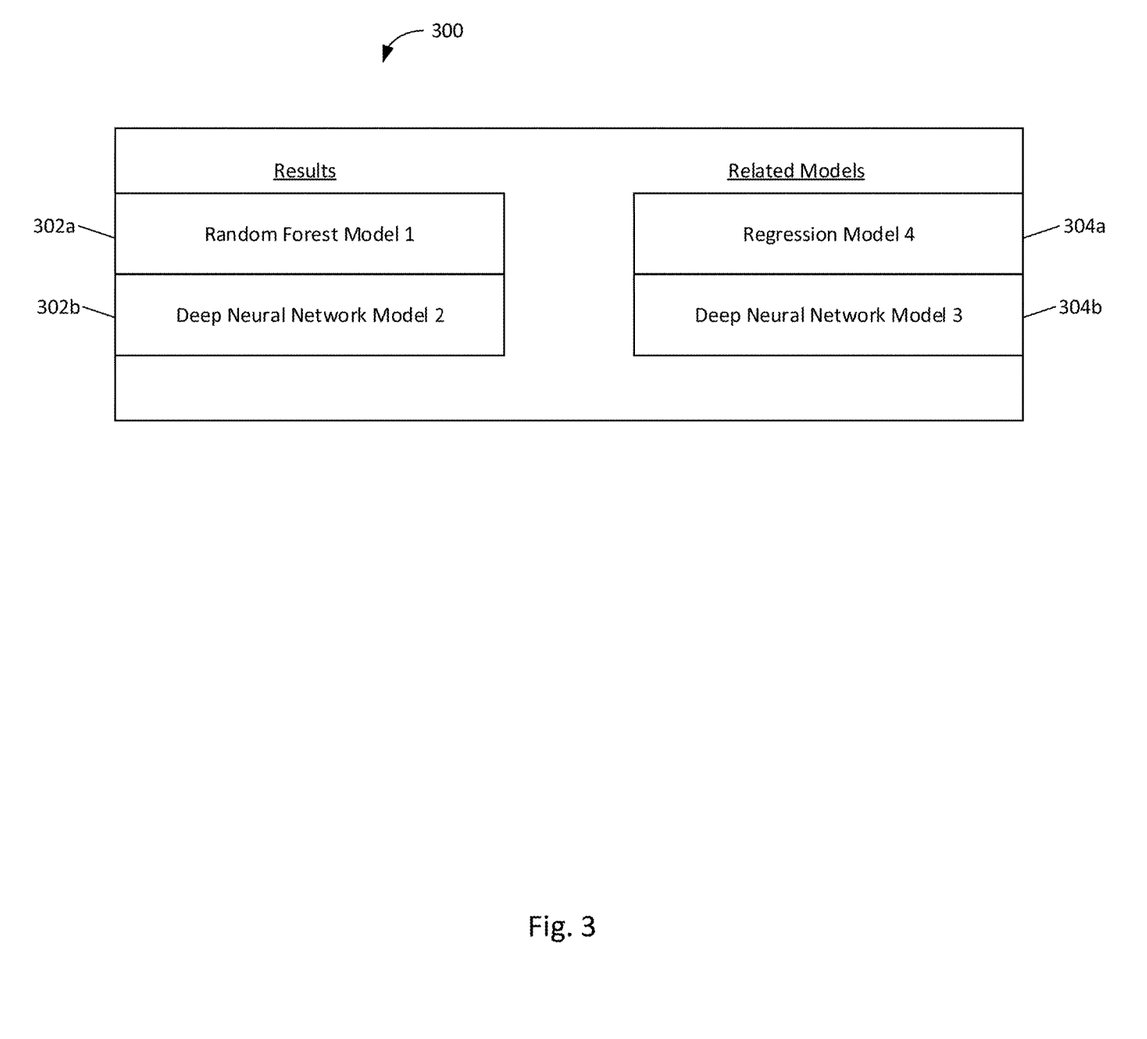
FIG. 3 depicts an exemplary graphical user interface showing results of a search of indexed models, consistent with disclosed embodiments.

FIG. 3 is an illustration of exemplary graphical user interface 300 for showing results of a search of indexed models. As depicted in FIG. 3, interface 300 may include a list of results, such as result 302a (a random forest model in the example of FIG. 3) and result 302b (a deep neural network model in the example of FIG. 3). For example, hyperparameter indexer 212 may have indexed a plurality of models such that, in response to a query, system 200 may extract results 302a and 302b. In some embodiments, result 302a may be above result 302b in order to indicate that result 302a matches the query more closely than result 302b. Alternatively, results 302a and 302b may be ranked alphabetically, randomly, by date (newer or older) added to a database by hyperparameter indexer 212, or the like.

Moreover, interface 300 may include a list of related results, such as related models 304a and 304b. For example, clusterer 214 may have clustered a plurality of models such that, in response to the query, system 200 may extract related models 304a and 304b. In one example, models 304a and 304b may be located in the same cluster (or a neighboring cluster) as result 302a and/or result 302b. In some embodiments, related model 304a may be above related model 304b in order to indicate that model 304a is more closely related to result 302a and/or result 302b than model 304b. Additionally or alternatively, model 304a may be juxtaposed with result 302a, and model 304b may be juxtaposed with result 302b to indicate cluster correspondence. Additionally or alternatively, related models 304a and 304b may be ranked alphabetically, randomly, by date (newer or older) added to a database by hyperparameter indexer 212, or the like.

Figure 4:
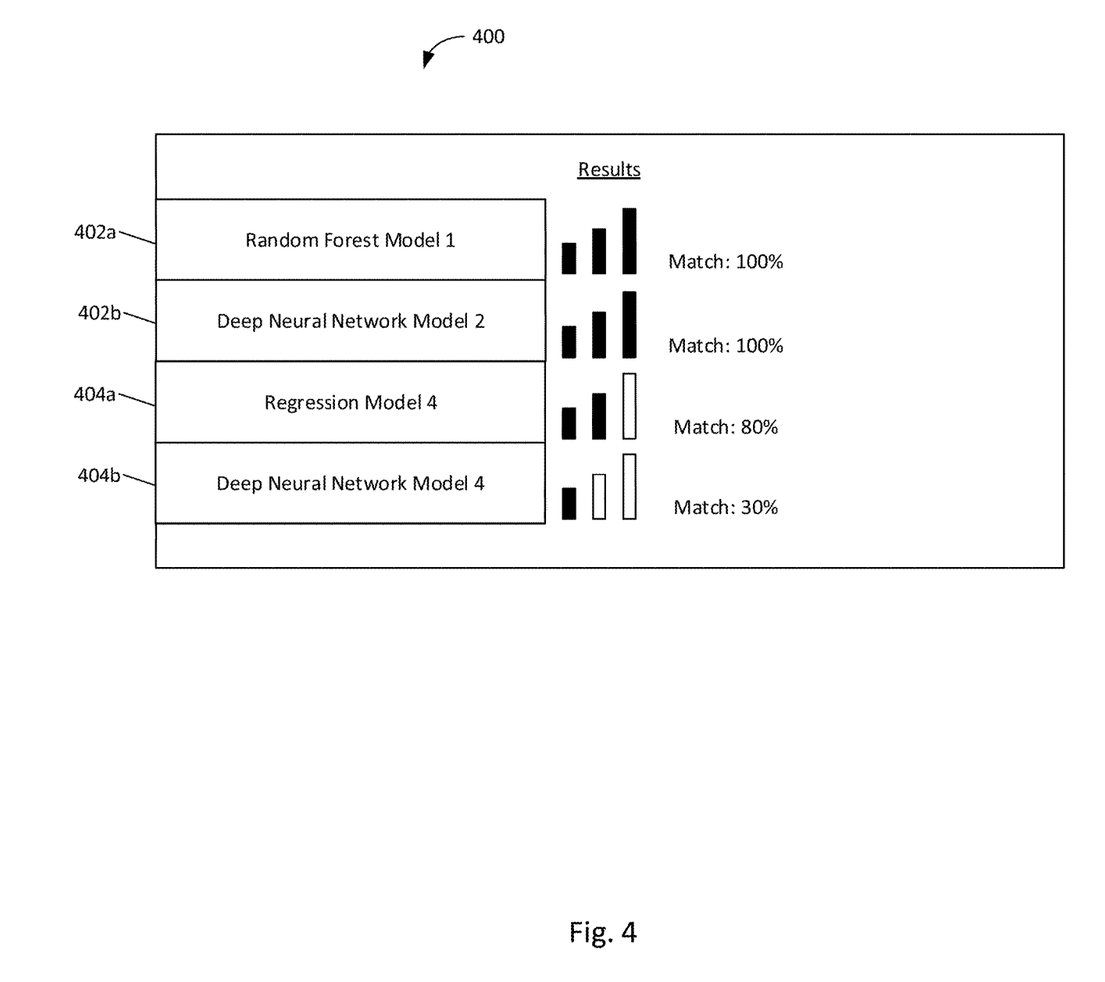
FIG. 4 depicts another exemplary graphical user interface showing results of a search of indexed models, consistent with disclosed embodiments.

FIG. 4 is an illustration of exemplary graphical user interface 400 for showing results of a search of indexed models. As depicted in FIG. 4, interface 400 may include a list of results, such as result 402a (a random forest model in the example of FIG. 4), result 402b (a deep neural network model in the example of FIG. 4), result 404a (a regression model in the example of FIG. 4), and result 404b (a deep neural network model in the example of FIG. 4). For example, hyperparameter indexer 212 may have indexed a plurality of models such that, in response to a query, system 200 may extract results 402a, 402b, 404a, and 404b. As depicted in FIG. 4, the results may be ranked by a level of match to the query. Additionally or alternatively, results 402a, 402b, 404a, and 404b may be ranked alphabetically, randomly, by date (newer or older) added to a database by hyperparameter indexer 212, or the like.

Moreover, interface 400 may include visual indicators of degrees of match for results 402a, 402b, 404a, and 404b. For example, clusterer 214 may have clustered a plurality of models such that, in response to the query, system 200 may extract results 402a and 402b as matches and results 404a and 404b as related models. In one example, results 404a and 404b may be located in the same cluster (or a neighboring cluster) as result 402a and/or result 402b. In the example of FIG. 4, related model 404a is above related model 404b in order to indicate that model 404a is more closely related to result 402a and/or result 402b than model 404b. Additionally or alternatively, related models 404a and 404b may be ranked alphabetically, randomly, by date (newer or older) added to a database by hyperparameter indexer 212, or the like.

Figure 5:
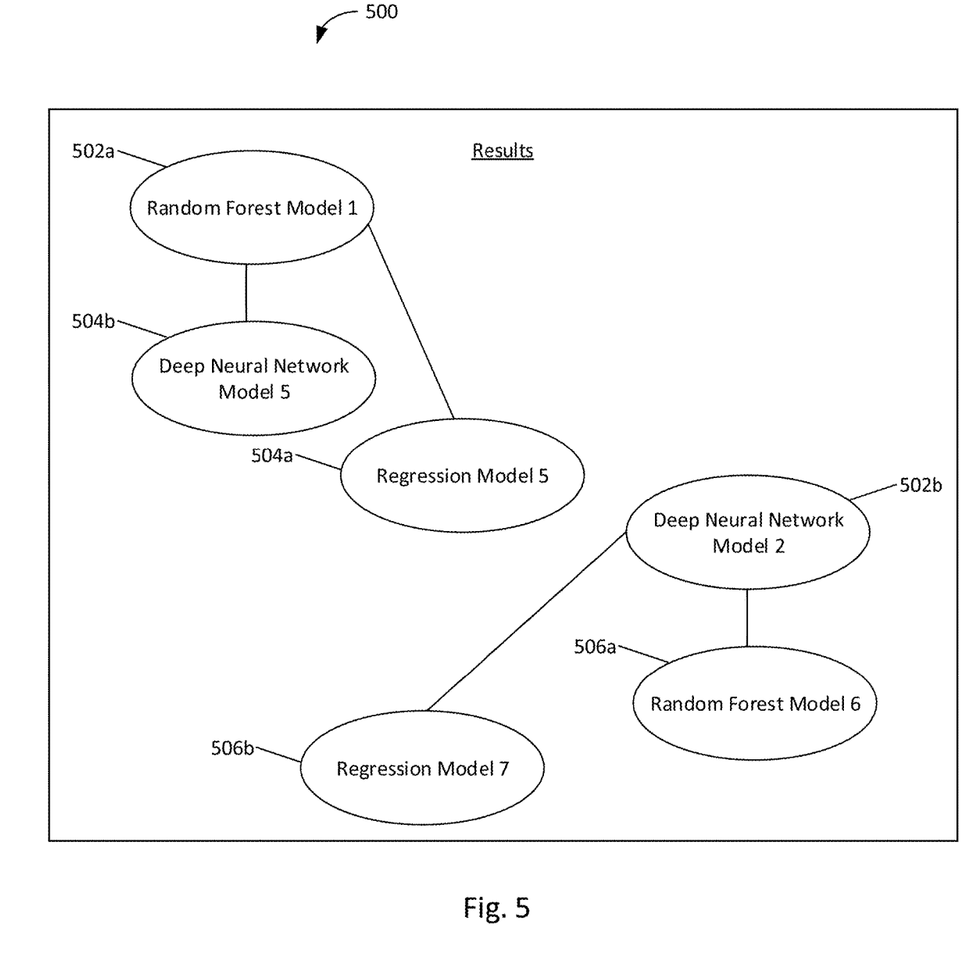
FIG. 5 depicts yet another exemplary graphical user interface showing results of a search of indexed models, consistent with disclosed embodiments.

FIG. 5 is an illustration of exemplary graphical user interface 500 for showing results of a search of indexed models. As depicted in FIG. 5, interface 500 may include a graph of results, such as result 502a (a random forest model in the example of FIG. 5), result 502b (a deep neural network model in the example of FIG. 5). Interface 500 may further include a model 504a (a regression model in the example of FIG. 5) and a model 504b (a deep neural network model in the example of FIG. 5) related to result 502a, and a model 506a (a random forest model in the example of FIG. 5) and a model 506b (a regression model in the example of FIG. 5) related to result 502b. For example, hyperparameter indexer 212 may have indexed a plurality of models such that, in response to a query, system 200 may extract results 502a and 502b.

Moreover, interface 500 may encode degrees of match for related models 504a, 504b, 506a, and 506b. For example, clusterer 214 may have clustered a plurality of models such that, in response to the query, system 200 may extract results 502a and 502b as matches, models 504a and 504b as related to result 502a, and models 506a and 506b as related to result 502b. In one example, models 504a and 504b may be located in the same cluster (or a neighboring cluster) as result 502a, and models 506a and 506b may be located in the same cluster (or a neighboring cluster) as result 502b. In the example of FIG. 5, related model 504b is graphically closer to result 502a in order to indicate that model 504b is more closely related to result 502a than model 504a. Similarly, related model 506a is graphically closer to result 502b in order to indicate that model 506a is more closely related to result 502b than model 506b.

Figure 6:
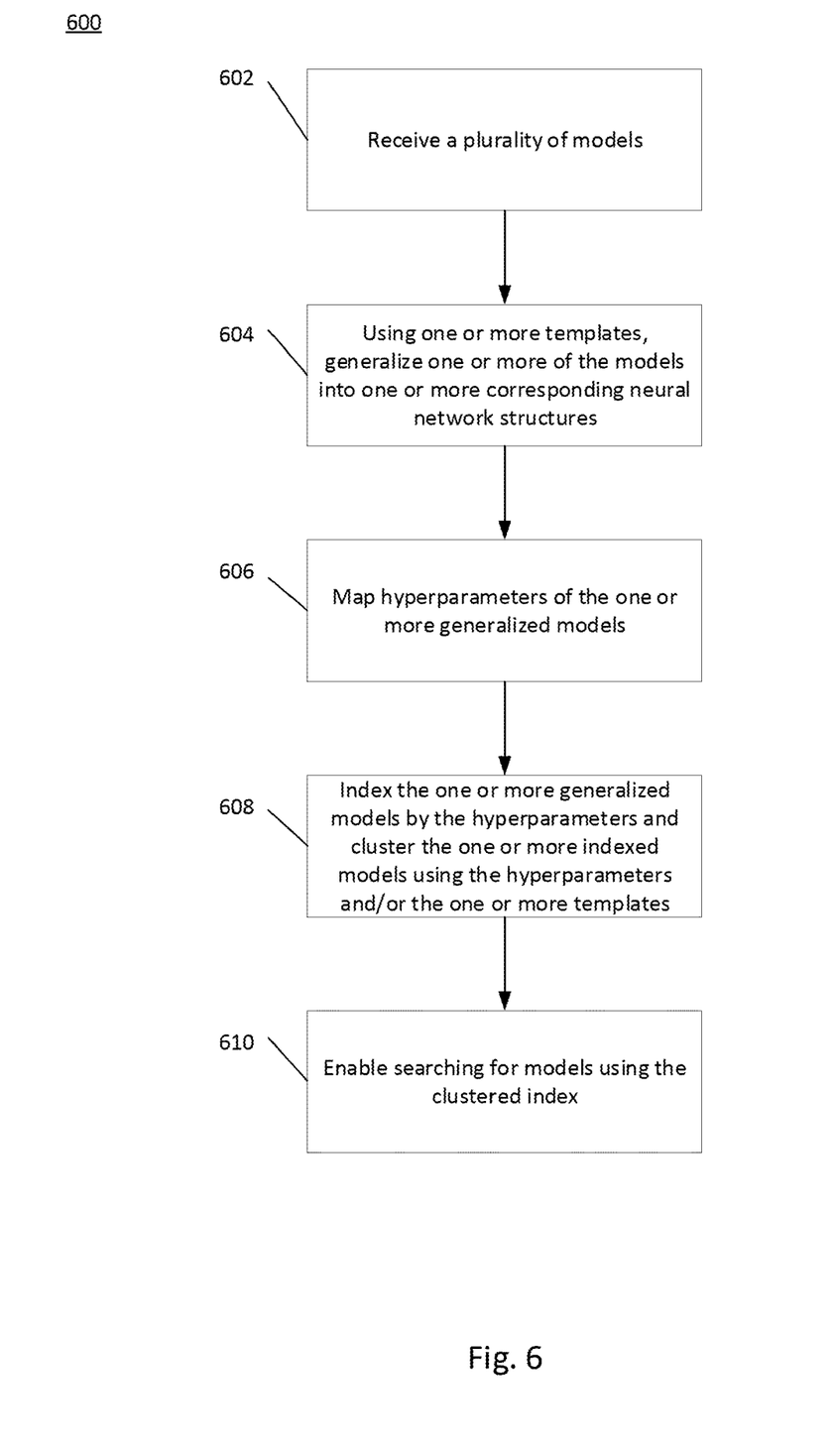
FIG. 6 depicts an exemplary process for indexing and mapping models by hyperparameters and cluster characteristics, consistent with disclosed embodiments.

FIG. 6 is a flow diagram of an exemplary process 600 for indexing and mapping models by hyperparameters and cluster characteristics. Process 600 may be executed by a system, e.g., system 400 described above.

At step 602, a processor, e.g., processor 204 of system 200, may receive a plurality of models. As explained above, the plurality of models may comprise machine learned models. For example, the plurality of models may comprise at least one random forest model, at least one neural network, at least one regression model, or the like. The models may be configured to generate structured data from unstructured data, as described above.

At step 604, using one or more templates, the processor may generalize one of more of the models into one or more corresponding neural network architectures. For example, the one or more templates may comprise mappings of model types to corresponding neural network architectures. The corresponding neural network architectures may include a number of layers, a number of nodes in each layer, and connections between the nodes. In some embodiments, the corresponding neural network architectures may further include at least one of activation functions for the nodes or a number of weights associated with each node.

In some embodiments, as explained above, the processor may train the generalized model using the same training and/or testing data used to train the received model. For example, the processor may extract the training and/or testing data from database(s) 206 in additional to receiving the model therefrom.

At step 606, the processor may map hyperparameters of the one or more generalized models. As explained above, the hyperparameters may comprise at least one of a regularization hyperparameter, a number of coefficients associated with nodes of a neural network, a number of layers of a neural network, a number of leaves in a decision tree, a learning rate, or the like. The hyperparameters may be directly extracted from a representation of the generalized model (e.g., a number of layers, a number of nodes, or the like may be extracted from a TensorFlow file describing a neural network). Additionally or alternatively, the hyperparameters may be determined during a training of the generalized model, as described above. For example, the processor may determine a learning rate during training of the generalized model.

At step 608, the processor may index the one or more generalized models by the hyperparameters. For example, the processor may generate a relational index such that generalized representations are retrievable using the hyperparameters. In other embodiments, the processor may generate a graphical index such that each generalized representation is a node and is connected, via an edge, to one or more nodes representing the hyperparameters.

In addition, the processor may cluster the indexed models using the hyperparameters and/or the one or more templates. For example, the clustering may include applying one or more thresholds to one or more of the hyperparameters to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each generalized model has a score associated with a degree of belonging in each cluster generated by the clustering. In such embodiments, the processor may store representations of the corresponding generalized models in association with each degree of belonging.

At step 610, the processor may enable searching for models using the clustered index. For example, the processor may store the generalized models with the received models, the index, and the clusters such that the index and the clusters are searchable.

Method 600 may include further steps. For example, the processor may store the received models in association with representations of the corresponding generalized models and store the index such that the representations and the received models are retrievable using the index. In some embodiments, the processor may further store, in association with the received models, any received documentation related to the received models, such that the documentation is retrievable using the index.

Figure 7:
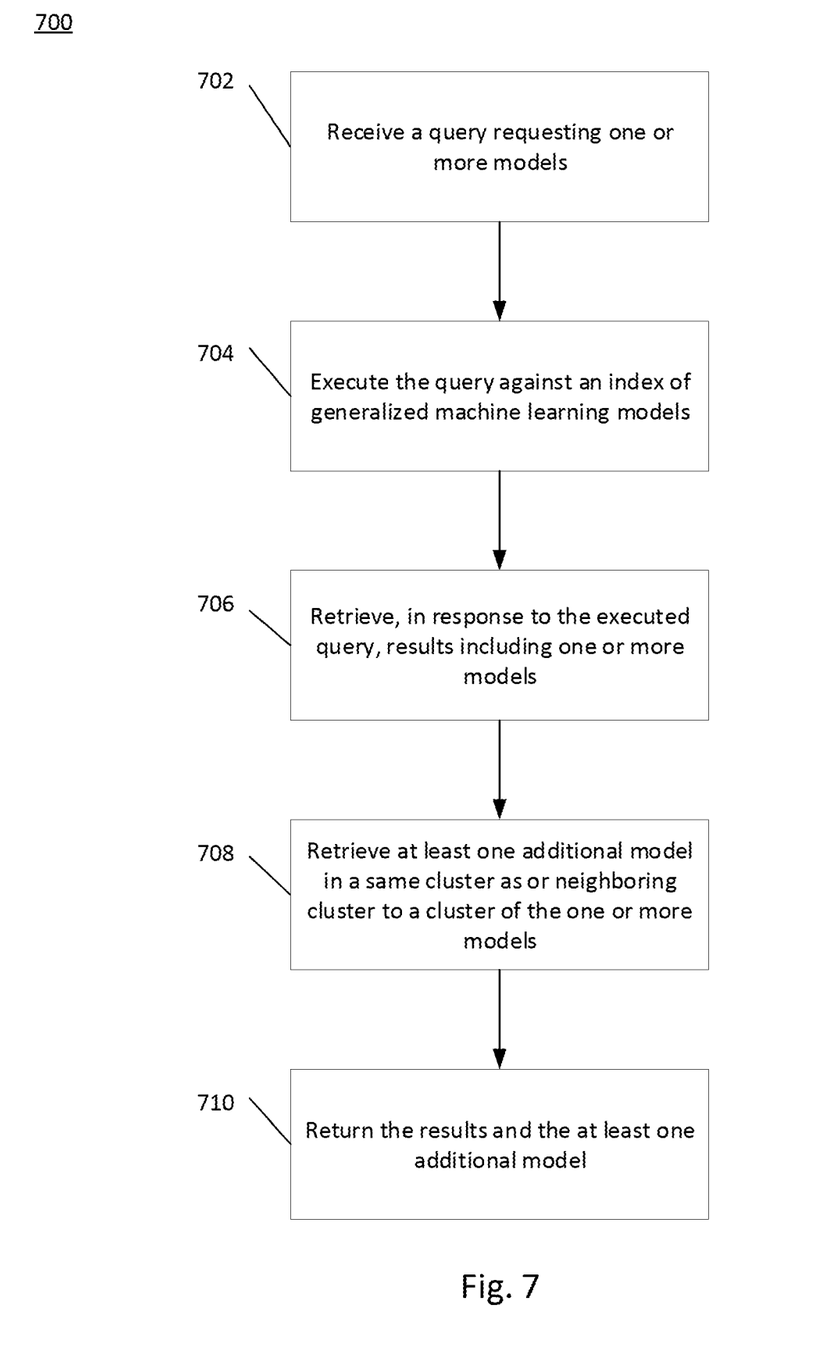
FIG. 7 depicts an exemplary process for searching indexed models by hyperparameters and cluster characteristics, consistent with disclosed embodiments.

FIG. 7 is a flow diagram of an exemplary process 700 for searching indexed models by hyperparameters and cluster characteristics consistent with disclosed embodiments. Process 700 may be executed by a system, e.g., system 200 described above.

At step 702, a processor, e.g., processor 204 of system 200, may receive a query requesting at least one model. Additionally or alternatively, the query may request models with at least one hyperparameter within at least one range.

In some embodiments, the query may comprise a database language query (such as a structure query language (SQL) command). In other embodiments, the query may comprise a natural language query. In such embodiments, the processor may apply natural language processing to the query to determine one or more hyperparameters relevant to the query and generate, based on the relevant hyperparameters, a database language query corresponding to the natural language query for executing.

At step 704, the processor may execute the query against an index of generalized machine learning models. For example, the processor may apply the SQL command to a relational index. In another example, the processor may apply a ArangoDB query language (AQL) command or other NoSQL command to a graphical index. The index may include hyperparameters of the models. Moreover, the database of models may be clustered, and the clusters may be based on the hyperparameters, as explained above. Additionally or alternatively, the clusters may be based on structural similarities of the generalized machine learning models.

At step 706, the processor may retrieve, in response to the executed query and from a database including the indexed generalized machine learning models, results including at least one model. In embodiments where the query requests models with at least one hyperparameter within at least one range, the processor may retrieve results including the requested models.

At step 708, the processor may retrieve at least one additional model in a same cluster as the at least one model. As explained above, the cluster may be based on at least one of structural similarities or hyperparameter similarities. Additionally or alternatively, the processor may retrieve one or more additional models in the same cluster as the requested models or neighboring clusters.

The clustering may be based on application of one or more thresholds to one or more of the hyperparameters to generate one or more clusters. Additionally or alternatively, the clustering may be based on at least one of hierarchical clustering, centroid-based clustering, distribution-based clustering, or density-based clustering.

In some embodiments, the clustering may be a fuzzy clustering such that each generalized model has a score associated with a degree of belonging in each cluster generated by the clustering. In such embodiments, the query may include a threshold used to select the at least one additional model. For example, the query may include a threshold such that all degrees of belonging below the threshold are not included in the same cluster as a result.

At step 710, the processor may return the at least one model and the at least one additional model as a response to the query. For example, the processor may display the results by displaying the requested models on one region of a graphical user interface and the one or more additional model on another region of the graphical user interface. For example, interface 300 of FIG. 3 and/or interface 500 of FIG. 5 may include the results.

Figure 8:
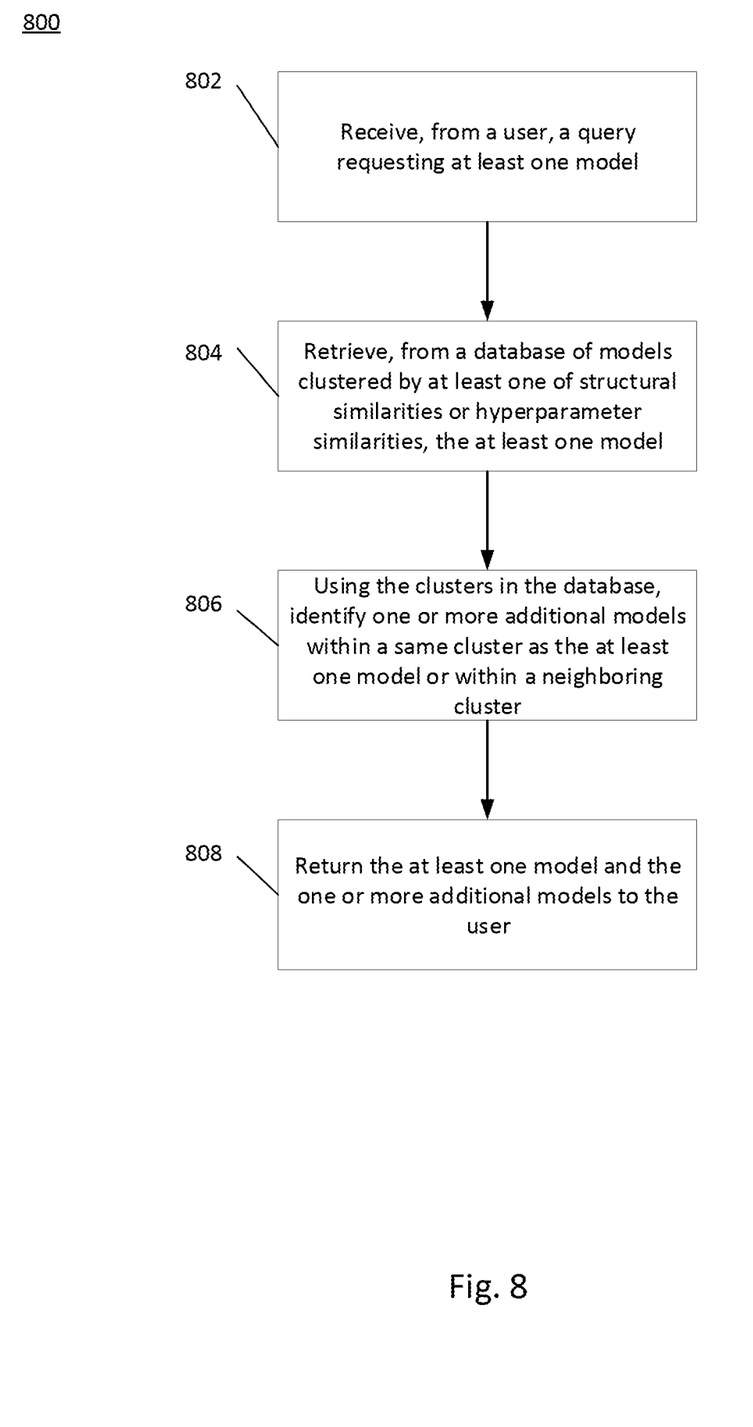
FIG. 8 depicts an exemplary process for suggesting similar models in response to model selection.

FIG. 8 is a flow diagram of an exemplary process 800 for suggesting similar models in response to model selection consistent with disclosed embodiments. Process 800 may be executed by a system, e.g., system 200 described above.

At step 802, a processor, e.g., processor 204 of system 200, may receive, from a user, an identifier associated with at least one model. For example, the user may enter the name of the at least one model, one or more hyperparameters of the at least one model, or the like. Additionally or alternatively, the processor may receive a query that requests at least one model, as explained in step 702 of FIG. 7 above.

At step 804, the processor may retrieve, from a database of models clustered by at least one of structural similarities or hyperparameter similarities, the at least one model. For example, the processor may execute the query against an index of clustered machine learning models. As explained above, the processor may execute a SQL or other relational command against a relational index or may execute an AQL or other NoSQL command against a graphical index. The index may include hyperparameters of the models, and the clusters may be based on the hyperparameters.

At step 806, using the clusters in the database, the processor may identify one or more additional models within a same cluster as the at least one model or within a neighboring cluster. As explained above, the cluster may be based on at least one of structural similarities or hyperparameter similarities.

The clustering may be based on application of one or more thresholds to one or more of the hyperparameters to generate one or more clusters. Additionally or alternatively, the clustering may be based on at least one of hierarchical clustering, centroid-based clustering, distribution-based clustering, or density-based clustering.

In some embodiments, the clustering may be a fuzzy clustering such that each generalized model has a score associated with a degree of belonging in each cluster generated by the clustering. In such embodiments, in response to executing the query against the database and/or the index, the processor may retrieve one or more additional models having one or more associated degrees of belonging to the same cluster as the at least one model within a threshold. For example, the query may include the threshold. Alternatively, the threshold may comprise a default value and may be adjustable by the user after the user views the results in step 808.

At step 808, the processor may return the at least one model and the one or more additional models to the user. For example, the processor may display the results by displaying the at least one model and the one or more additional models together with the one or more associated degrees of belonging on a graphical user interface. For example, interface 400 of FIG. 4 and/or interface 500 of FIG. 5 may include the results and the degrees of belonging.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for indexing and mapping models by hyperparameters and cluster characteristics, comprising:
at least one processor; and
at least one non-transitory memory storing instructions that, when executed by the at least one processor cause the at least one processor to perform operations comprising:
receiving a plurality of models, the models configured to transform a base representation of data into a structured representation of the data, wherein the plurality of models comprise a set of machine learning models;
processing one or more templates, wherein the templates comprise mapping of model types to corresponding neural network architectures;
generalizing one or more of the models into one or more corresponding neural network architectures, wherein the generalizing links the plurality of models with the corresponding neural network architectures;
mapping hyperparameters of the one or more generalized models, wherein the hyperparameters comprise characteristics of the one or more generalized models;
indexing the one or more generalized models by the hyperparameters;
storing the hyperparameters as an index with the generalized models;
clustering the one or more indexed models using the hyperparameters, wherein the clustering comprises applying one or more thresholds to one or more of the hyperparameters to generate one or more clusters;
storing the received models in association with the generalized models, wherein the index and the clusters are digitally searchable; and
enabling searching for models using the clustered index.

2. The system of claim 1, wherein the plurality of models comprise neural networks.

3. The system of claim 1, wherein the plurality of models comprises at least one random forest model.

4. The system of claim 1, wherein the hyperparameters comprise at least one of a regularization hyperparameter, a number of coefficients associated with nodes of a neural network, a number of layers of a neural network, a number of leaves in a decision tree, or a learning rate.

5. The system of claim 1, wherein the one or more templates comprise mappings of model types to corresponding neural network architectures.

6. The system of claim 5, wherein the corresponding neural network architectures include a number of layers, a number of nodes in the layers, and connections between the nodes.

7. The system of claim 6, wherein the corresponding neural network architectures further include at least one of activation functions for the nodes or a number of weights associated with each node.

8. The system of claim 1, wherein the operations further comprise storing the index such that the representations and the received models are retrievable using the index.

9. The system of claim 8, wherein the operations further comprise storing, in association with the received models, received documentation related to the received models, such that the documentation is retrievable using the index.

10. The system of claim 1, wherein clustering comprises at least one of hierarchical clustering, centroid-based clustering, distribution-based clustering, or density-based clustering.

11. The system of claim 1, wherein clustering comprises a fuzzy clustering such that each generalized model has a score associated with a degree of belonging in each cluster generated by the clustering.

12. The system of claim 11, wherein the operations further comprise storing representations of the corresponding generalized models in association with each degree of belonging.

13. A system for searching indexed models by hyperparameters and cluster characteristics, comprising:
at least one processor; and
at least one non-transitory memory storing instructions that, when executed by the at least one processor cause the at least one processor to perform operations comprising:
receiving a query requesting at least one machine learning model;
determining one or more hyperparameters relevant to the query;
executing the query against an index of generalized machine learning models, the index including hyperparameters of the models, wherein the hyperparameters comprise characteristics of the generalized machine learning models;
retrieving, in response to the executed query, results including at least one model;
retrieving at least one additional model in a same cluster as the at least one model, the cluster based on at least one of structural similarities or hyperparameter similarities, and on one or more thresholds applied to the hyperparameters; and
returning the at least one model and the at least one additional model as a response to the query.

14. The system of claim 13, wherein the query comprises a database language query.

15. The system of claim 13, wherein the query comprises a natural language query, and the operations further comprise:
applying natural language processing to the query to determine one or more hyperparameters relevant to the query; and
generating, based on the relevant hyperparameters, a database language query corresponding to the natural language query for executing.

16. The system of claim 13, wherein the clusters are based on at least one of hierarchical clustering, centroid-based clustering, distribution-based clustering, or density-based clustering.

17. The system of claim 13, wherein the clusters are fuzzy clusters, and the query includes a threshold used to select the at least one additional model.

18. A system for suggesting similar models in response to model selection, comprising:
at least one processor; and
at least one non-transitory memory storing instructions that, when executed by the at least one processor cause the at least one processor to perform operations comprising:
receiving, from a user, an identifier associated with at least one machine learning model;
retrieving, from a database of machine learning models clustered by at least one of structural similarities or hyperparameter similarities, the at least one model, wherein the structural similarities and the hyperparameter similarities are based on the identifier associated with the at least one model;
using the clusters in the database, identifying one or more additional machine learning models within a same cluster as the at least one machine learning model or within a neighboring cluster, wherein the clusters are based on one or more thresholds applied to the hyperparameters; and
returning the at least one machine learning model and the one or more additional machine learning models to the user.

* * * * *